United States Patent
Takahashi

(10) Patent No.: US 8,654,211 B2
(45) Date of Patent: Feb. 18, 2014

(54) DATA RECORDING/REPRODUCING DEVICE, DATA RECORDING/REPRODUCING PROGRAM AND DATA REPRODUCING DEVICE THAT PROTECT PRIVATE DATA FROM REPRODUCTION BY UNAUTHORIZED PERSONS

(75) Inventor: Isao Takahashi, Koshigaya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/325,534

(22) Filed: Dec. 14, 2011

(65) Prior Publication Data
US 2012/0081575 A1 Apr. 5, 2012

Related U.S. Application Data

(63) Continuation of application No. 12/309,265, filed as application No. PCT/JP2007/064352 on Jul. 20, 2007, now abandoned.

(30) Foreign Application Priority Data

Jul. 20, 2006 (JP) .................. 2006-198325

(51) Int. Cl.
*H04N 5/76* (2006.01)
*H04N 5/228* (2006.01)

(52) U.S. Cl.
USPC ..................... 348/231.2; 348/222.1

(58) Field of Classification Search
USPC ....................................... 348/231.2
See application file for complete search history.

(56) References Cited

U.S. PATENT DOCUMENTS 6,661,966 B1 * 12/2003 Furuyama et al. ............ 386/207
6,748,195 B1 * 6/2004 Phillips ....................... 455/41.2
7,136,093 B1 * 11/2006 Itoh et al. .................. 348/207.11
7,577,522 B2 * 8/2009 Rosenberg ..................... 701/433
7,765,461 B2 * 7/2010 Suzuki et al. ................. 715/200

(Continued)

FOREIGN PATENT DOCUMENTS

| JP | A-11-296276 | 10/1999 |
| JP | A-2002-165170 | 6/2002 |

(Continued)

OTHER PUBLICATIONS

Jan. 29, 2013 Office Action issued in Japanese Application No. 2008-525916 (with English Translation).

(Continued)

*Primary Examiner* — Ngoc-Yen Vu
(74) *Attorney, Agent, or Firm* — Oliff PLC

(57) ABSTRACT

A data recording/reproducing device includes: a position detection unit that detects information (hereafter referred to as position information) indicating a position at which data are acquired and reproduced; a determining unit that determines which specific set of geographical information, among a plurality of sets of geographical information defined in advance, the position information detected by the position detection unit at the time of data acquisition and data reproduction corresponds to; a recording control unit that records the acquired data into a recording medium based upon determining results provided by the determining unit; a selection unit that selects reproduction-permitted data from the recording medium based upon the geographical information determined by the determining unit at the time of data reproduction; and a reproducing unit that outputs and reproduces at least one set of data among the reproduction-permitted data having been selected.

19 Claims, 5 Drawing Sheets

(56) References Cited

U.S. PATENT DOCUMENTS

Figure 4:
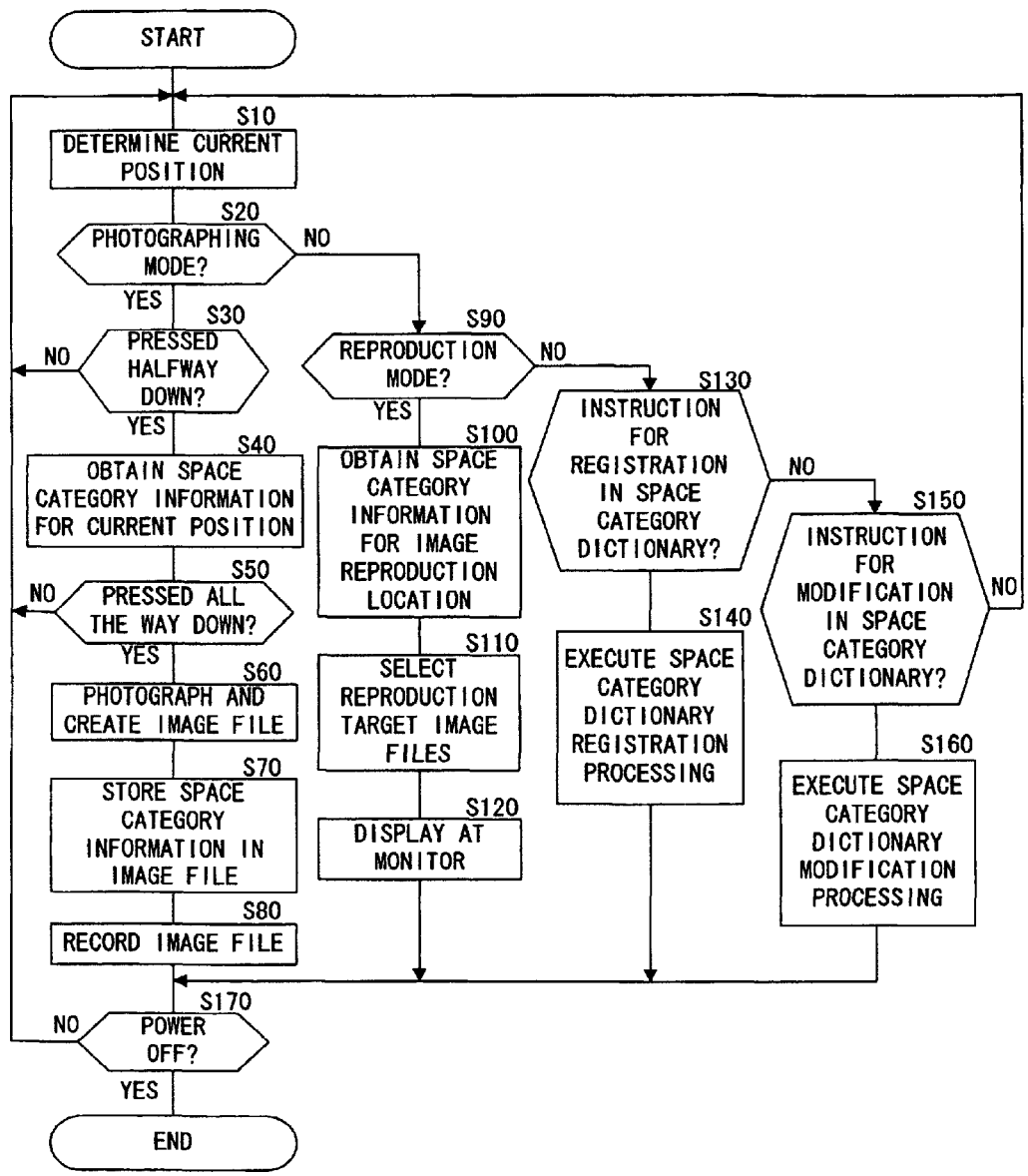

| | | | |
|---|---|---|---|
| 8,537,003 B2* | 9/2013 | Khachaturov et al. | 340/540 |
| 2002/0076220 A1 | 6/2002 | Takahashi | |
| 2003/0061166 A1* | 3/2003 | Saito et al. | 705/54 |
| 2004/0190715 A1 | 9/2004 | Nimura et al. | |
| 2006/0059093 A1 | 3/2006 | Takaragi et al. | |

FOREIGN PATENT DOCUMENTS

| | | |
|---|---|---|
| JP | A-2002-366409 | 12/2002 |
| JP | A-2002-123801 | 4/2004 |
| JP | A-2004-215103 | 7/2004 |
| JP | A-2004-302930 | 10/2004 |
| JP | A-2004-355058 | 12/2004 |
| JP | A-2006-086590 | 3/2006 |
| WO | WO 2005/094064 A1 | 10/2005 |

OTHER PUBLICATIONS

Jul. 30, 2013 Notification of Reasons for Refusal issued in Japanese Patent Application No. 2008-525916 (with translation).

* cited by examiner

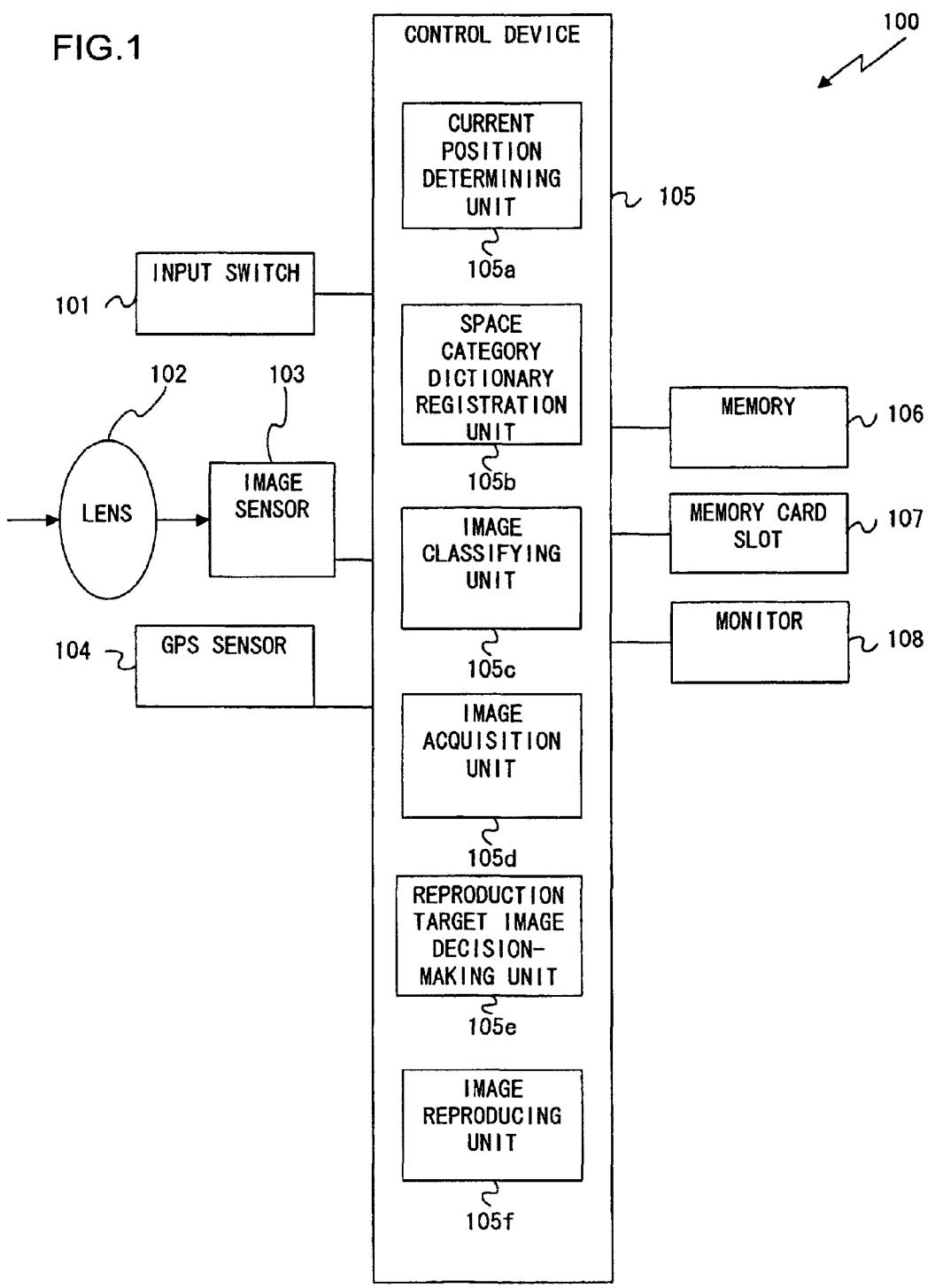

FIG.2

| SPACE CATEGORY DICTIONARY | |
|---|---|
| SPATIAL AREA INFORMATION | SPACE CATEGORY INFORMATION |
| CENTRAL POSITION (X1, Y1), RADIUS (R1) | PRIVATE SPACE |
| CENTRAL POSITION (X2, Y2), RADIUS (R2) | PRIVATE SPACE |
| CENTRAL POSITION (X3, Y3), RADIUS (R3) | HOME SPACE |
| CENTRAL POSITION (X4, Y4), RADIUS (R4) | HOME SPACE |
| CENTRAL POSITION (X5, Y5), RADIUS (R5) | FRIEND SPACE |
| CENTRAL POSITION (X6, Y6), RADIUS (R6) | BUSINESS SPACE |
| CENTRAL POSITION (X7, Y7), RADIUS (R7) | PUBLIC SPACE |
| CENTRAL POSITION (X8, Y8), RADIUS (R8) | PUBLIC SPACE |
| CENTRAL POSITION (X9, Y9), RADIUS (R9) | PUBLIC SPACE |

FIG.3

| CONVERSION RESULTS | ULTIMATE OUTPUT | | | | |
| --- | --- | --- | --- | --- | --- |
| | PRIVATE SPACE | HOME SPACE | FRIEND SPACE | BUSINESS SPACE | PUBLIC SPACE |
| PRIVATE SPACE | ○ | ○ | ○ | ○ | ○ |
| HOME SPACE | × | ○ | ○ | ○ | ○ |
| FRIEND SPACE | × | × | ○ | ○ | ○ |
| BUSINESS SPACE | × | × | × | ○ | ○ |
| PUBLIC SPACE | × | × | × | × | ○ |

DATA RECORDING/REPRODUCING DEVICE, DATA RECORDING/REPRODUCING PROGRAM AND DATA REPRODUCING DEVICE THAT PROTECT PRIVATE DATA FROM REPRODUCTION BY UNAUTHORIZED PERSONS

This is a Continuation of application Ser. No. 12/309,265 filed Jan. 13, 2009, which is a National Phase of PCT/JP2007/064352 filed Jul. 20, 2007, which claims priority to Japanese Patent Application No. 2006-198325 filed Jul. 20, 2006. The disclosure of the prior applications are hereby incorporated by reference herein in their entirety.

TECHNICAL FIELD

The present invention relates to a data recording/reproducing device that records and reproduces data, a data recording/reproducing program and a data reproducing device that reproduces data.

BACKGROUND ART

There are electronic cameras known in the related art engaged in photographing operation in a private mode selected by the user through a private button operation. In such an electronic camera, the reproduction of an image photographed in the private mode can be prohibited so as to disallow viewing of the private photograph by unauthorized persons (see, for instance, patent reference literature 1).

Patent reference literature 1: Japanese Laid Open Patent Publication No. 2004-215103

DISCLOSURE OF THE INVENTION

Problems to be Solved by the Invention

However, the private image has a possibility to be exposed to the eyes of unauthorized persons if the private mode is forgotten to be selected in advance in the electronic camera in the related art.

A data recording/reproducing device according to the present invention comprises: a position detection unit that detects information (hereafter referred to as position information) indicating a position at which data are acquired and reproduced; a determining unit that determines which specific set of geographical information, among a plurality of sets of geographical information defined in advance, the position information detected by the position detection unit at the time of data acquisition and data reproduction corresponds to; a recording control unit that records the acquired data into a recording medium based upon determining results provided by the determining unit; a selection unit that selects reproduction-permitted data from the recording medium based upon the geographical information determined by the determining unit at the time of data reproduction; and a reproducing unit that outputs and reproduces at least one set of data among the reproduction-permitted data having been selected.

The recording control unit may record the geographical information, determined at the time of data acquisition, into the recording medium together with the data acquired by a data acquisition unit; and the selection unit may search the recording medium for data assigned with geographical information matching the geographical information determined by the determining unit at the time of data reproduction and selects the data as the reproduction-permitted data. The data recording/reproducing device described above may further comprise: a table creation unit that creates in advance a table containing the geographical information and the position information correlated with each other. The determining unit in the data recording/reproducing device unit determines the geographical information by referencing the table based upon the detected position information at the time of data acquisition or data reproduction.

The data recording control unit may configured to classify data acquired by the acquisition unit and records the data into folders created in advance in the recording medium, each folder being in correspondence to a specific set of geographical information. The selection unit in the data recording/reproducing device selects data in a folder corresponding to the geographical information determined at the time of data reproduction as the reproduction-permitted data. The data recording/reproducing device described above further comprises: a folder creation unit that creates in advance folders each in correspondence to a specific set of geographical information correlated to the position information.

The geographical information is constituted with information related to spatial areas (hereafter referred to as spatial area information) each indicating a specific range containing a position at which data are acquired and reproduced. The spatial area information includes a plurality of sets of information corresponding to at least a first spatial area and a second spatial area, access by unspecified third parties being prohibited in the first spatial area and access by unspecified third parties being not prohibited in the second spatial area. It is preferred that the first spatial area is a private area and the second spatial area is a public area.

It is preferred that in the data recording/reproducing device that defines the first and the second spatial area, when the spatial area information detected at the time of data acquisition corresponds to both the first spatial area and the second spatial area, the determining unit designates the spatial area information as information corresponding to the first spatial area.

The determining unit in the data recording/reproducing device further comprising a recognition unit that recognizes characteristics of the data, may determine spatial area information corresponding to the acquired data by taking into consideration recognition results provided by the recognition unit.

In the data recording/reproducing device that defines the first and the second special area, if the spatial area information detected at the time of data reproduction corresponds to the first spatial area, the selection unit selects data designated with the spatial area information corresponding to both the first spatial area and the second spatial area at the time of data acquisition as the reproduction-permitted data, but if the spatial area information determined at the time of data reproduction corresponds to the second spatial area, the selection unit selects only data designated with the spatial area information corresponding to the second spatial area at the time of data acquisition as the reproduction-permitted data.

In the data recording/reproducing device that defines the first and the second special area as special area information, if the spatial area information determined at the time of data reproduction corresponds to both the first spatial area and the second spatial area, the spatial area information corresponding to the first spatial area is designated as the spatial area information for the data reproduction.

It is preferred that the position detection unit pinpoints a position assumed by the data recording/reproducing device on a map by converting position information output from a GPS to coordinate values on the map.

The spatial areas described above are each made up with an area taking up a specific range on the map, as defined by a central position indicating a specific point on the map and a specific radius centered on the central position.

The data in the data recording/reproducing device include at least one of; still image data, video data and audio data.

According to another aspect of the present invention, a data recording/reproducing program enabling a computer to execute: a position detection procedure through which information (hereafter referred to as position information), indicating a position at which data are acquired and reproduced, is detected; a determining procedure through which the position information detected through the position detection procedure at the time of data acquisition or reproduction is determined to correspond to one of a plurality of sets of geographical information defined in advance; a recording control procedure through which, the acquired data are recorded into a recording medium based upon determining results provided through the determining procedure; a selection procedure through which reproduction-permitted data are selected from the recording medium based upon the geographical information determined through the determining procedure at the time of data reproduction; and a reproduction procedure through which at least one set of reproduction-permitted data among the selected reproduction-permitted data is output and reproduced.

According to another aspect of the present invention, a data reproducing device that reads data files each assigned with a specific set of geographical information among a plurality of sets of geographical information defined in advance and reproduces data contained in the files, comprises: a position detection unit that detects information (hereafter referred to as position information) indicating a position at which the data files having been read are reproduced; a determining unit that determines which specific set of geographical information, among the plurality of sets of geographical information defined in advance, the position information detected by the position detection unit at a time of data reproduction corresponds to; a selection unit that selects reproduction-permitted data from the recording medium based upon the geographical information determined by the determining unit at the time of data reproduction; and a reproduction unit that outputs and reproduces at least one set of reproduction-permitted data among the selected reproduction-permitted data.

In the data reproducing device, the data files each contain data constituted with the geographical information together with the data to be reproduced; and the selection unit searches through the data files having been read based upon the geographical information determined at the time of data reproduction and selects data assigned with geographical information matching the geographical information at a time of data acquisition as the reproduction-permitted data. On the other hand, the data files each contain data classified and recorded into a specific folder among folders each corresponding to a set of geographical information; and the selection unit selects data contained in a folder corresponding to the geographical information determined at the time of data reproduction as the reproduction-permitted data.

According to the another aspect of the present invention, a data reproducing method adopted when reading data files each assigned with a set of geographical information among a plurality of sets of geographical information defined in advance and reproducing data in the files, comprises: detecting information (hereafter referred to as position information) indicating a position at which the data files are to be read and reproduced; determining a specific set of geographical information among the plurality of sets of geographical information defined in advance, to which the position information detected by the position detection unit at a time of data reproduction, corresponds; and selecting reproduction-permitted data from the recording medium based upon the geographical information determined by the determining unit at the time of data reproduction and reproducing the selected reproduction-permitted data.

Effect of the Invention

According to the present invention, specific reproduction-permitted data can be automatically selected in correspondence to the geographic information indicating the data acquisition and reproduction locations and, as a result, private data are protected from reproduction by unauthorized persons even when the user fails to perform certain operations.

BRIEF DESCRIPTION OF THE DRAWINGS (FIG. 1) A block diagram of an embodiment achieved by adopting the data recording/reproducing device according to the present invention (FIG. 2) A specific example of data that may be registered in the space category dictionary (FIG. 3) A specific example of data that may be registered in the space category table (FIG. 4) A flowchart of the processing executed in the digital camera 100

(FIG. 5) An overall configuration of the system through which the program product is provided

BEST MODE FOR CARRYING OUT THE INVENTION

FIG. 1 is a block diagram of an embodiment achieved by adopting the data recording/reproducing device according to the present invention in a digital camera. A digital camera 100 includes an input switch 101, a lens 102, an image sensor 103, a GPS sensor 104, a control device 105, a memory 106, a memory card slot 107 and a monitor 108.

The input switch 101 includes various switches operated by the user and outputs an operation signal corresponding to a specific operation to the control device 105. The lens 102 is constituted with a plurality of optical lens groups. It is to be noted that the lens 102 in the illustration in FIG. 1 is represented by a single lens. The image sensor 103, which may be a CCD sensor, captures a subject image input through the lens 102 and outputs image signals obtained by capturing the image to the control device 105. The control device 105 generates image data by executing various types of signal processing and image processing on the image signals input thereto.

Upon receiving a GPS (global positioning system) signal from a GPS satellite, the GPS sensor 104 detects information related to the current position of the digital camera 100, e.g., latitude/longitude information. It then outputs the information on the current position of the digital camera 100 thus detected to the control device 105.

The control device 105, constituted with a CPU and peripheral circuits, includes functional units such as a current position determining unit 105a, a space category dictionary registration unit 105b, an image classifying unit 105c, an image acquisition unit 105d, a reproduction target image decision-making unit 105e and an image reproducing unit 105f.

The current position determining unit 105a determines the current position of the digital camera 100 based upon position information output from the GPS sensor 104. The current position determining unit in the embodiment determines the current position of the digital camera 100 indicated in map data recorded in the memory 106. It is assumed that a given geographic point on the map can be specified by coordinate values taken along the X coordinate axis and the Y coordinate axis in the map data recorded in the memory 106. Namely, the current position determining unit 105 converts the position information output from the GPS sensor 104 to an X coordinate value and a Y coordinate value on the map, so as to pinpoint the current position of the digital camera 100 on the map.

The space category dictionary registration unit 105b registers data into a space category dictionary such as that shown in FIG. 2 in response to an instruction issued by the user. The space category dictionary contains sets of spatial area information 2a each stored in correspondence to a specific set of space category information 2b and is generated as data recorded in the memory 106. A set of spatial area information 2a is made up with geographical information (spatial area information) used to pinpoint a spatial area on the map and the corresponding set of space category information 2b indicates the spatial area category into which the space indicated by the spatial area information 2a is classified.

The coordinate values (X, Y) of the central point of the geographical position on the map and a radius R around the central point are recorded as the spatial area information 2a and thus, an area present over a specific range on the map can be determined based upon the central point and radius. It is to be noted that instead of the central point coordinate values (X, Y) of the geographical position on the map, coordinate values (X'1, Y'1, X'2, Y'2) defining the space as a rectangular space may be recorded as the spatial area information 2a.

In addition, as the space category information 2b, the results obtained by classifying the space indicated by the spatial area information 2a in correspondence to the accessibility of the space by third parties are recorded. The space may be classified either as a closed space or as an open space based upon the accessibility of the space by third parties. The closed space, which may be a space used by a specific individual and is less likely to be accessed by third parties, is, in other words, an area to which access by unauthorized third parties is prohibited. The open space, which may be a public space highly likely to be accessed by third parties, is, in other words, an area to which access by unauthorized third parties is not prohibited.

In the embodiment, the space indicated by the spatial area information 2a, classified either as a closed space or an open space, is further classified into one of the following five categories of spaces corresponding to the five types of space category information (A)~(E) below, based upon the accessibility of the space by third parties. Namely, one of the following classifications of space category information (A)~ (E) below is recorded as the space category information corresponding to the particular set of spatial area information 2a in the space category dictionary. It is to be noted that spaces may be classified into various other categories in correspondence to the user's needs, instead of the five categories described below.

(A) Private Space

Space category information "private space", which is a sub-category of closed space, is used to indicate a space where the user of the digital camera 100 is likely to take private photographs (images), such as his own room, a study or the like.

(B) Home Space

Space category information "home space", which is a sub-category of closed space, is used to indicate a space where the user of the digital camera 100 is likely to take family photographs, e.g., a living room.

(C) Friend Space

Space category information "friend space", which is a sub-category of closed space, is used to indicate a space where the user of the digital camera 100 is likely to take photographs with friends, e.g., a friends home.

(D) Business Space

Space category information "business space", which is a sub-category of closed space, is used to indicate a space where the user of the digital camera 100 is likely to take photographs related to his work, such as his office or a business partner's office.

(E) Public Space

Space category information "public space", which is a type of open space, is used to indicate a space where the user of the digital camera 100 is likely to take photographs in a public area such as a museum or any space not categorized as (A) through (D).

As the user operates the input switch 101 and an instruction for data registration into the space category dictionary is issued, the space category dictionary registration unit 105b registers the spatial area information and the corresponding space category information into the space category dictionary through the following procedure. The space category dictionary registration unit 105b first obtains from the current position determining unit 105a the position information indicating the geographical location for which the instruction for data registration into the space category dictionary has been issued by the user and designates the position indicated by the position information as the central point (X, Y) in correspondence to the spatial area information. In addition, the space category dictionary registration unit 105b prompts the user to enter the radius of the registration target space. As the user operates the input switch 101 and the radius is entered on the monitor 108, the space category dictionary registration unit 105b designates the input radius as the radius R to be registered in the spatial area information.

Once the central point (X, Y) and the radius R to be registered as the spatial area information are specified, the space category dictionary registration unit 105b prompts the user to enter the space category information corresponding to the particular spatial area information. For instance, the space category dictionary registration unit 105b may bring up the five types of space category information (A)~(E) described earlier on the monitor 108 so as to allow the user to select a space category information indicating a specific category on the monitor 108. As the user operates the input switch 101 and specifies the space category information, the space category dictionary registration unit 105b registers the specified space category information into the space category dictionary as the space category information corresponding to the spatial area information.

For instance, the user, wishing to register his own room in the space category dictionary operates the input switch 101 to issue an instruction for data registration into the space category dictionary near the center of his room. In response, the central point (x1, y1) is determined by the space category dictionary registration unit 105b and the user is prompted to enter the radius for the target space. As the user, prompted by the display on the monitor 108, enters a radius R1 for his room, the space category dictionary registration unit 105b determines the radius R1 as the radius of the target space (the user's room). Then, the user is prompted by an instruction displayed on the monitor 108 to select one of the different categories indicated by the space category information (A)~(E) in correspondence to the accessibility of his room by third parties. For instance, the user may select "private space", enabling the space category dictionary registration unit 105b to register information 2c related to the user's room into the space category dictionary.

The processing procedure described above is executed in each target space the user wishes to register in the space category dictionary, a space category dictionary containing a plurality of sets of spatial area information 2a each paired up with a set of space category information 2b, as shown in FIG. 2, is created. It is to be noted that the user is able to modify information registered in the space category dictionary as needed. In response to an instruction for modifying information in the space category dictionary issued by the user, the space category dictionary registration unit 105b prompts the user to enter a password and only if the correct password is entered, the space category dictionary registration unit allows the information to be modified. Thus, modification of information contained in the space category dictionary by an unauthorized third party is prevented.

Once given permission for information modification, the user is able to fine-adjust the locate of the space indicated on the map by modifying the central position (X1, Y1) or the radius R in the spatial area information corresponding to the information 2c related to the user's room or alter the space category information. For instance, the user may modify space category information indicating "private space" to that indicating "home space".

Upon detecting that a shutter button included in the input switch 101 has been pressed halfway down at the digital camera 100 set in the photographing mode by the user, the image classifying unit 105c references the space category dictionary to obtain the space category information corresponding to the current location. Namely, based upon the output from the current position determining unit 105a, the image classifying unit 105c determines the coordinate values of the current position assumed on the map. The image classifying unit 105c then makes a decision as to whether or not the information registered in the space category dictionary includes spatial area information indicating the determined coordinate values if it is decided that the space category dictionary contains spatial area information indicating the determined coordinate values, the image classifying unit 105c extracts the space category information correlated to the particular spatial area information and stores the extracted information into the memory 106 on a temporary basis.

If the space category dictionary contains data having been registered by the user in spaces adjacent to each other, the adjacent spaces may partially overlap, depending upon the radius R having been specified by the user. If the current position indicated by the coordinate values is contained within the range where such spaces overlap, as described above, a plurality of sets of space category information will be extracted in correspondence to the plurality of sets of spatial area information indicating the spaces containing the determined coordinate point. Under such circumstances, the image classifying unit 105c temporarily stores into the memory 106 the space category information indicating the least accessibility by third parties among the plurality of sets of space category information having been extracted so as to append the image photographed at a point belonging to the plurality of spaces with the space category information assuring the highest level of privacy. As a result, it is ensured that the image appended with the space category information having the highest level of privacy is not readily reproduced, as detailed later.

If, on the other hand, it is decided that there is no spatial area information indicating a space containing the point indicated by the determined coordinate values, the image classifying unit 105c prompts the user to register a space containing the current position into the space category dictionary. Since the coordinate values indicating the current position on the map have already been determined through the processing described above, the image classifying unit 105c simply needs to prompt the user to enter the radius R of the space and specific space category information and take in the information entered by the user. Once the user enters the space radius R and the space category information, the image classifying unit 105c registers the entered information into the space category dictionary and also temporarily stores the space category information having been entered by the user into the memory 106.

If the user does not enter a space radius R or space category information, the image classifying unit 105c temporarily stores space category information preselected as a default value into the memory 106. The space category information "private space" indicating the lowest level of accessibility by third parties material be selected as the default value so as to ensure that the image appended with the space category information "private space", is not reproduced readily. It is to be noted that the space category information default value may be a fixed value or it may be an adjustable value that can be adjusted by the user as necessary.

Subsequently, upon detecting that the user has pressed the shutter button all the way down, the image acquisition unit 105d controls the image sensor 103 to obtain image data constituting the subject image captured via the image sensor and temporarily stores the image data thus obtained into the memory 106. The image acquisition unit 105d then executes image processing of the known art such as interpolation processing, color conversion processing and edge emphasis processing on the acquired image data and further executes compression processing so as to compress the image data into a predetermined image format such as the JPEG format.

The image acquisition unit 105b next generates an image file by adding various types of additional information to the image data having undergone the image processing. For instance, the image acquisition unit 105d may generate an image file in the Exif format containing the JPEG image data stored in an image data portion thereof and the additional information stored in an additional information portion thereof. The additional information stored into the additional information portion will usually include information indicating the image photographing date/time and information indicating the photographing conditions under which the image was photographed. It is to be noted that information indicating the shutter speed, the ISO sensitivity and the aperture value, for instance, may be stored as the information related to the image photographing conditions.

The image classifying unit 105c records into the additional information portion of the image file generated by the image acquisition unit 105d the space category information corresponding to the current location, having been stored in the memory 106, as the space category information for the image photographing location. Subsequently, the image classifying unit 105c records the image file containing the space category information stored in the additional information portion thereof into the memory card loaded in the memory card slot 107. As the image file with the space category information recorded in the additional information portion is recorded into the memory card as described above, the particular image file is assigned with the photographic space defined by the radius R centered on the photographing location. In other words, each set of image data obtained by taking a photograph can be classified by the third party accessibility factor based upon geographical information indicating the photographing location.

The user is able to issue an instruction for reproduction of the image data contained in an image file recorded in the memory card, as described above, by operating the input switch 101. For instance, as the user sets the digital camera 100 in a reproduction mode and an image reproduction instruction is issued, the reproduction target image decision-making unit 105e searches through image files recorded in the memory card based upon the geographical information related to the reproduction location and selects a reproduction target image file.

In the embodiment, the reproduction target image decision-making unit 105e allows reproduction of the image file if either condition (i) or condition (ii) described below is satisfied and selects the reproduction-permitted image file as the reproduction target image file. Namely:
(i) the accessibility of the photographing space by third parties matches the third-party accessibility of the space where the image reproduction instruction is issued;
(ii) the accessibility of the photographing space by third parties is higher than the third-party accessibility of the space where the image reproduction instruction is issued.

The image reproducing unit 105f subsequently reads the selected reproduction target image file from the memory card and outputs the image file thus read out to the monitor 108. As a result, only images that were photographed in spaces with higher levels of third-party accessibility than the third-party accessibility of the space where the image reproduction instruction is issued can be reproduced at the particular image reproduction location.

For instance, if the image reproduction instruction has been issued in a space categorized as a public space, only images having been photographed in spaces appended with the space category information "public space" are allowed to be reproduced and the reproduction-permitted images are designated as reproduction target images accordingly. In other words, an image having been photographed in a space with a lower level of third-party accessibility than the third-party accessibility of "public space" cannot be reproduced. Through these measures, reproduction of private images such as images of family members and job-related images in a public space is prevented. In a space categorized as "private space", on the other hand, images having been photographed in all types of spaces from private spaces to public spaces can be reproduced. Thus, the user is able to view images having been photographed in all types of spaces without having to worry about strangers seeing private photographs.

In other words, when an image reproduction instruction is issued in a more public space, more rigorous conditions are imposed with regard to images that can be reproduced so as to ensure that private images are not reproduced readily in a public space. When an image reproduction instruction is issued in a more private space, less rigorous conditions are imposed with regard to the selection of reproduction-target images so as to allow reproduction of more images. For this purpose, the reproduction target image decision-making unit 105e and the image reproducing unit 105f are engaged in the following processing.

First, based upon the output from the current position determining unit 105a, the reproduction target image decision-making unit 105e determines the coordinate values of the coordinate point on the map assumed by the position (image reproduction location) at which the user has issued an image reproduction instruction. The reproduction target image decision-making unit 105e then makes a decision as to whether or not the space category dictionary contains spatial area information indicating the coordinate point having been determined. If it is decided that the space category dictionary includes spatial area information indicating the determined coordinate values, the reproduction target image decision-making unit 105e extracts the space category information correlated to the particular spatial area information and thus determines the space classification corresponding to the image reproduction location.

If the space category dictionary being referenced indicates that there are a plurality of spaces that may be specified as the image reproduction location, i.e., there are a plurality of sets of spatial area information indicating spaces containing the coordinate point of the image reproduction location, a plurality of sets of space category information will be extracted in correspondence. Under such circumstances, the reproduction target image decision-making unit 105e selects the space category information with the highest level of third-party accessibility among the plurality of sets of space category information having been extracted as the space category information for the image reproduction location. In other words when the image reproduction location is contained in a range where a plurality of spaces overlap, the image reproduction location is categorized as a more public space so as to ensure that image files recorded as highly private images are reproduced at the particular location less readily for better privacy protection.

If, on the other hand, it is decided that there is no spatial area information indicating the determined coordinate values, the reproduction target image decision-making unit 105e prompts the user to register a space indicating the position at which the image reproduction instruction has been issued into the space category dictionary. Since the coordinate values indicating the image reproduction portion on the map have already been determined through the processing described above, the reproduction target image decision-making unit 105e simply needs to prompt the user to enter the radius R of the space and specific space category information and take in the information entered by the user. Once the user enters the requested information, the reproduction target image decision-making unit 105e registers the entered information into the space category dictionary and also designates the space category information having been entered by the user into the memory 106, as space category information 2b for the image reproduction location.

If the user does not enter a space radius R or space category information, the reproduction target image decision-making unit 105e selects a preset space category information default value as the space category information for the image reproduction location. It is to be noted that the space category information default value may be a fixed value or it may be an adjustable value that can be adjusted by the user as needed. If the space category information default value is set as a fixed value, "public space" should be selected as the default value in order to impose the most rigorous restrictions with regard to the selection of reproduction target images for better privacy protection.

The reproduction target image decision-making unit 105e determines reproduction target space category information in correspondence to which reproduction-permitted reproduction target images are to be selected, based upon the space category information for the image reproduction location having been specified, as described above. For this purpose, the reproduction target image decision-making unit 105e references a space category table shown in FIG. 3 to select reproduction target space category information in correspondence to the space category information for the image reproduction location.

The space category table shown in FIG. 3 is prepared and recorded into the memory 106 in advance. The space category table indicates whether or not each of the five categories of spaces, i.e., private space 3b through public space 3f, is to be designated as reproduction target space category information by either O or X, in correspondence to a given set of space category information 3a for the image reproduction location. Namely, the reproduction target image decision-making unit 105e selects only the space category information marked with O on the space category table as reproduction target space category information for each set of space category information 3a for the image reproduction location and does not designate any space category information marked with an X as reproduction target space category information.

The reproduction target image decision-making unit 105e selects each image file having recorded in the additional information portion thereof reproduction target space category information thus determined as a reproduction target image file. In other words, it selects image files, each containing the reproduction target space category information recorded in the additional information portion thereof as reproduction target image files, among the image files recorded in the memory card. As a result, the reproduction target image decision-making unit 105e is able to permit selective reproduction of image files with the additional image portions thereof containing the space category information indicated by O in the space category table in correspondence to each set of image reproduction location space category information 3a. In addition, the reproduction target image decision-making unit 105e is able to prohibit reproduction of any image file having recorded in the additional information portion thereof space category information marked with X in the space category table in correspondence to a given set of image reproduction location space category information 3a.

For instance, assuming that the space category information 3a for the location at which the user has issued an image reproduction instruction indicates "public space", Public Space 3f alone is marked with O in the space category table and, accordingly, the reproduction target image decision-making unit 105e selects only image files having recorded in the additional information portions thereof "public space" as the space category information as reproduction target image files. If, on the other hand, the location at which the user has issued the image reproduction instruction is categorized as "home space" in the space category information 3a, Home Space 3c, Friend Space 3d, Business Space 3e and Public Space 3f are marked with O in correspondence to "home space" in the space category table and, accordingly, the reproduction target image decision-making unit 105e selects image files having such space category information recorded in the additional information portions thereof as reproduction target image files.

The image reproducing unit 105f reproduces each reproduction target image file by outputting the reproduction target image files selected by the reproduction target image decision-making unit 105e to the monitor 108. As described above, the digital camera 100 achieved in the embodiment allows only image files corresponding to the space category information for the location at which the user has issued the image reproduction instruction, to be selected as reproduction target image files.

FIG. 4 presents a flowchart of the processing executed in the digital camera 100 in the embodiment. The processing shown in FIG. 4 is executed by the control device 105 as a program started up when the power to the digital camera 100 is turned on.

In step S10, the current position determining unit 105a determines the current position of the digital camera 100 based upon the position information output from the GPS sensor 104. Namely, the position information output from the GPS sensor 104 is converted to information indicating an X-coordinate value and a Y-coordinate value on the map, thereby pinpointing the current position of the digital camera 100 on the map. The operation then proceeds to step S20 in which the image classifying unit 105c makes a decision as to whether or not the digital camera 100 is currently set in the photographing mode. If it is decided that the digital camera 100 is set in the photographing mode, the operation proceeds to step S30.

In step S30, the image classifying unit 105c makes a decision as to whether or not the shutter button included in the input switch 101 has been pressed halfway down by the user. If it is decided that the shutter button has not been pressed halfway down, the operation returns to step S10 to repeatedly execute the processing. If, on the other hand, it is decided that the shutter button has been pressed halfway down, the operation proceeds to step S40. In step S40, the image classifying unit 105c obtains the space category information for the current position by referencing the space category dictionary shown in FIG. 2 and stores the space category information into the memory 106. It is to be noted that if the space category information for the current position cannot be obtained from the space category dictionary in this step, the user is prompted to register the current position as explained earlier and the registered space category information or the default value is stored into the memory 106. In addition, if a plurality of sets of space category information is obtained, the space category information with the lowest level of third-party accessibility is stored into memory 106. The operation then proceeds to step S50.

In step S50, the image acquisition unit 105d makes a decision as to whether or not the shutter button has been pressed all the way down by the user. If it is decided that the shutter button has not been pressed all the way down, the operation returns to step S10 to repeatedly execute processing. If, on the other hand, it is decided that the shutter button has been pressed all the way down, the operation proceeds to step S60. In step S60, the image acquisition unit 105d controls the image sensor 103 so as to obtain image data generated by capturing the subject image and then executes various types of image processing of the known art on the acquired image data. An image file in the Exif format is then generated by storing the image data having undergone the image processing into the image data portion of the file and storing the additional information into the additional information portion of the file. Subsequently, the operation proceeds to step S70.

In step S70, the image classifying unit 105c records the space category information for the current position, having been stored in the memory 106, into the additional information portion of the image file as the space category information corresponding to the image photographing location. The operation then proceeds to step S80 in which the image classifying unit 105c records the image file containing the space category information stored in its additional information portion into the memory card loaded into memory card slot 107. The operation then proceeds to step S170 to be described in detail later.

The processing executed after deciding in step S20 that the digital camera 100 is not currently set in the photographing mode is now explained. In this situation, the operation proceeds to step S90, in which the reproduction target image decision-making unit 105e makes a decision as to whether or not the digital camera 100 is set in the reproduction mode. If it is decided that the reproduction mode is currently selected, the operation proceeds to step S100, in which the reproduction target image decision-making unit 105e obtains the space category information corresponding to the space containing the current position having been determined in step S10, from the space category dictionary as the space category information for the image reproduction location.

It is to be noted that if the space category information for the image reproduction location cannot be obtained from the space category dictionary in this step, the user is prompted to register the image reproduction location as explained earlier and the registered space category information or the default value is designated as the space category information for the image reproduction location. In addition, if a plurality of sets of space category information is obtained, the space category information with the highest level of third-party accessibility is selected as the space category information for the image reproduction location.

The operation then proceeds to step S110, in which the reproduction target image decision-making unit 105e determines reproduction target space category information corresponding to the space category information for the image reproduction location by referencing the space category table described in reference to FIG. 3. It then selects image files with the reproduction target space category information recorded in the additional information portions thereof as reproduction target image files, before the operation proceeds to step S120. In step S120, the image reproducing unit 105f reproduces the reproduction target image files having been selected by the reproduction target image decision-making unit 105e by outputting them to the monitor 108. The operation then proceeds to step S170 to be detailed later.

If, on the other hand, it is decided in step S90 that the digital camera 100 is not currently set in the reproduction mode, the operation proceeds to step S130. In step S130, the space category dictionary registration unit 105b makes a decision as to whether or not an instruction for data registration in the space category dictionary has been issued by the user via the input switch 101. If it is decided that an instruction for data registration in the space category dictionary has been issued, the operation proceeds to step S140, in which the space category dictionary registration unit 105b registers spatial area information and space category information with regard to a space corresponding to the current position having been determined in step S10 into the space category dictionary. The operation then proceeds to step S170.

If it is decided that no instruction for data registration in the space category dictionary has been issued, the operation proceeds to step S150. In step S150, the space category dictionary registration unit 105b makes a decision as to whether or not an instruction for modifying data registered in the space category dictionary has been issued by the user via the input switch 101. If it is decided that an instruction for data modification has been issued, the operation proceeds to step S160, in which the space category dictionary registration unit 105b modifies data registered in the space category dictionary based upon data entered by the user. At this time, the space category dictionary registration unit 105b prompts the user to enter the password and allows the user to modify information only if the correct password is entered. The operation then proceeds to step S170.

In step S170, a decision is made as to whether or not the user has depressed a power button at the input switch 101 and thus power to the digital camera 100 has been turned off. If it is decided that the power has not been turned off, the operation returns to step S10 to repeatedly execute the processing. If, on the other hand, it is decided that the power has been turned off, the processing ends.

The following advantages are achieved through the embodiment described above.

(1) Image files are each classified into a specific category based upon the geographical information indicating the image file photographing location before they are recorded. When an image reproduction instruction is issued, image files, selected as reproduction target image files based upon the image file classification results and the geographical information indicating the image reproduction location, are reproduced. Thus, reproduction target image files can be automatically selected based upon the geographical information indicating data acquisition locations and the geographical information indicating the reproduction location, ensuring that only image files suitable for reproduction at a particular reproduction location are reproduced.

(2) The geographical information indicating a specific image photographing location and the geographical information indicating a specific image reproduction location are each constituted with space category information assigned to the corresponding spatial area information to indicate the specific category of space the photographing or reproduction location. A given set of space category information indicates one of the five different categories of space (A)~(E) corresponding to varying levels of third-party accessibility. As a result, reproduction target image files can be selected in correspondence to the levels of third-party accessibility to various categories of spaces into which the image photographing locations and the image reproduction location are classified as described above.

(3) Image files photographed in spaces with the third-party accessibility matching the third-party accessibility of the reproduction space and image files photographed in spaces with higher levels of third-party accessibility than the level of the third-party accessibility of the reproduction space are selected as the reproduction target image files. In other words, reproduction target image files are selected by imposing rigorous selection conditions for image reproduction in a space where strangers are likely to be able to view reproduced images, i.e., a space with a high level of third-party accessibility, so as to ensure only images photographed in relatively public spaces with strangers present are selected as the reproduction target images. However, less rigorous selection conditions are imposed in selecting reproduction target image files for reproduction in a space where strangers are less likely to be able to view reproduced images, i.e., a space with a lower level of third-party accessibility, so as to allow more images to be reproduced.

(4) if there are a plurality of types of space category information indicating different space categories for a given photographing location, the photographic image file is classified based upon the space category information with the lowest level of third-party accessibility among the plurality of sets of space category information. Through these measures, an image file obtained at a photographing location contained in a range where a plurality of spaces overlap is automatically appended with space category information that will not allow the image file to be readily selected as a reproduction target image, ensuring better privacy protection.

(5) In addition, if a plurality of sets of space category information is extracted in correspondence to the location at which an image reproduction instruction is issued, the space category information with the highest level of third-party accessibility among the plurality of sets of space category information is selected as the space category information for the image reproduction location. As a result, more rigorous conditions are imposed when selecting reproduction target images for image reproduction to take place at a location present in a range where a plurality of spaces overlap, so as to assure better privacy protection.

(6) When the user issues an instruction for modifying data in the space category dictionary, the user is prompted to enter his password and is allowed to modify information only if he enters the correct password. Thus, information modification by an unauthorized third party is prevented.

-Variations-

It is to be noted that the digital camera achieved in the embodiment allows for the following variations.

(1) In the embodiment described above, the space category information for a given photographing location is obtained by referencing the space category dictionary based upon the position of the photographing location on the map and an image file containing the space category information thus obtained recorded in the additional information portion thereof is recorded into the memory card. However, the present invention is not limited to this example and instead, folders may be created in advance in the memory card, each in correspondence to a specific set of space category information, the space category information for the photographing location may be obtained by referencing the space category dictionary based upon the position of the photographing location assumed on the map and the image file may be recorded into the folder corresponding to the space category information thus obtained. In this case, even an image file without an additional information portion, raw data and the like, can be classified based upon the space category information indicating the photographing locations.

In the embodiment, the space category information for a given photographing location, obtained based upon the position of the photographing location on the map, is recorded into the additional information portion of the image file and the image file is automatically recorded into the memory card. As an alternative, the space category information assigned to a photographic image may be indicated at the monitor 108 each time a photograph is taken. In addition, a speaker may be mounted at the digital camera 100 and the space category information assigned to the photographic image may be reported to the user with a specific sound output through the speaker. These measures allow the user to immediately obtain the image classification information assigned to the photographic image.

(3) An explanation is given above in reference to the embodiment on an example in which image files are classified based upon the space category information assigned in correspondence to the photographing locations. However, image files may be classified by also taking into consideration the characteristics of the subject. For instance, a photographic image may undergo face recognition processing of the known art so as to recognize the face of the subject in the photographic image. Then, if the recognized face belongs to a preregistered person, the space category information to be stored in the additional information portion of the image file may be adjusted in correspondence to the particular person. In more specific terms, if the space category information for the photographing location indicates "public space" and the face of the subject in the photographic image belongs to a friend of the user, the space category information for the photographing location may be adjusted to "friend space" before it is registered in the additional information portion. If, on the other hand, the face of the subject in the photographic image belongs to a child of the user, the space category information for the photographing location may be adjusted to "home space" before it is registered in the additional information portion.

In addition, the user may be allowed to modify the space category information determined by the image classifying unit 105c and recorded in the additional information portion by the image acquisition unit 105d. In such a case, if an instruction for modifying the space category information recorded in the additional information portion is issued, the user may be prompted to enter his password and the modification of the space category information may be permitted only if the correct password is entered, so as to prevent unauthorized data modification by a third party.

(4) An explanation is given above in reference to the embodiment on an example in which reproduction target image files are selected by referencing the space category table prepared in advance. The user may be allowed to modify the space category table as he sees fit. In such a case, when an instruction for modifying data in the space category table is issued, the user may be prompted to enter his password and the data modification may be permitted only if the correct password is entered, so as to prevent unauthorized data modification by a third party.

(5) In the embodiment described above, the space category information obtained by referencing the space category dictionary is recorded into the additional information portion of each image file. Instead, spatial area information obtained by referencing the space category dictionary may be recorded into the additional information portion of the image file. In this case, in response to an image reproduction instruction, the reproduction target image decision-making unit 105e should obtain the space category information corresponding to the image reproduction location by referencing the space category dictionary. Then, spatial area information assigned with the space category information matching the space category information for the image reproduction location should be extracted from the space category dictionary. Subsequently, image files with spatial area information matching the extracted spatial area information recorded in their additional information portions, among the image files recorded in the memory card, should be selected as reproduction target image files.

(6) An explanation is given above in reference to the embodiment on an example in which each time the user presses the shutter button halfway down, the space category information for the photographing location is obtained based upon the current position indicating the photographing location on the map determined by the current position determining unit 105a. As an alternative, after the digital camera 100 is started up, the space category information for the photographing location obtained in response to an initial halfway press operation of the shutter button may be held until the power is turned off. In such a case, the space category information held in the digital camera may be appended to all the images photographed before the power is turned off. Since the user is more likely to turn off the power to the digital camera 100 before moving into a different space and is therefore more likely to stay in the same space while the power to the digital camera 100 remains in an ON state, the same space category information is appended to images photographed in a single space so as to eliminate the need to obtain the space category information for the individual images and thus reduce the processing load.

(7) An explanation is given above in reference to the embodiment on an example in which each set of spatial area information is obtained by pinpointing the current position as a point on the map indicated by an X-coordinate value and a Y-coordinate value in a two-dimensional XY coordinate system and determining the space containing the current position based upon the current position coordinate values and the radius R. However, if three-dimensional map data are stored as the map data, spatial area information may be generated by pinpointing the current position as a point on the map indicated by coordinate values taken along the X-axis, the Y-axis and the Z-axis representing the height of the space in a three-dimensional XYZ coordinate system and determining the space containing the current position based upon the current position coordinate values and the radius R.

(8) While an explanation is given above in reference to the embodiment in which the digital camera 100 equipped with a GPS sensor 104 pinpoints the current position based upon the output from the GPS sensor 104, the current position may instead be pinpointed through a PHS system or a UWB system of the known art. As a further alternative, the light illuminating a given space may contain information equivalent to the spatial area information indicating the particular space, i.e., the information indicating the current position coordinate values assumed on the map and the space radius, and the digital camera 100 may recognize the space based upon the information contained in the illuminating light.

(9) In the embodiment described above, the current position determining unit 105a pinpoints the current position of the digital camera 100 on the map based upon the position information output from the GPS sensor 104. Then, as the user presses the shutter button halfway down, the image classifying unit 105c obtains the information indicating the current position of the digital camera 100 on the map determined by the current position determining unit 105a. Instead, the current position determining unit 105a may pinpoint the current position of the digital camera 100 on the map based upon the position information output from the GPS sensor 104 only in response to a halfway press operation of the shutter button by the user and the image classifying unit 105c may obtain the information indicating the current position thus determined.

(10) An explanation is given above in reference to the embodiment on an example in which the digital camera 100 is utilized as a data recording/reproducing device and a photographic image file (still image data) is classified based upon the space category information. Instead, an audio data or video data recording/reproducing device may be used as the data recording/reproducing device and data recorded in such a device may be classified based upon the space category information. For instance, the present invention may be adopted in a data recording/reproducing device constituted with a digital video camera. In such a case, video data obtained through a shooting operation may be classified based upon the space category information assigned in correspondence to the shooting location and reproduction target video data may be selected based upon the space category information corresponding to the reproduction location. Alternatively, the present invention may be adopted in a data recording/reproducing device constituted with an IC recorder and, in such a case, audio data obtained through a recording operation may be classified based upon the space category information assigned to the recording location and reproduction target audio data may be selected based upon the space category information corresponding to the reproduction location.

(11) The digital camera 100 may be equipped with a communication function enabling it to communicate with an external server and, in such a case, the space category dictionary in FIG. 2 and the space category table in FIG. 3 may be recorded in the external server. In this situation, if there are a plurality of digital cameras 100 capable of connecting with the external server, the external server should hold the space category dictionary and the space category table in correspondence to each of the users of the digital cameras 100. In addition, an image file may be transmitted in an e-mail from a given digital camera 100 to another digital camera 100 via the external server. The external server should then identify the user of the sender camera and the user of the recipient camera based upon the e-mail addresses of the sender and the recipient. Under these circumstances, it is desirable that the external server transmit the image file after replacing the space category information appended in the additional information portion at the sender digital camera 100 with the space category information for the recipient user by referencing the space category dictionary stored in correspondence to the recipient user. It is to be noted that the users of the sender camera and the recipient camera may be identified based upon the production serial numbers assigned to the digital cameras 100 or the user IDs of the users instead of the e-mail addresses. Furthermore, the recipient may be a device other than a digital camera 100, such as a personal computer or a portable information terminal.

(12) An explanation is given above in reference to the embodiment on an example in which the present invention is adopted in a data recording/reproducing device, such as a digital camera, capable of recording data and reproducing recorded data. However, the present invention may also be adopted in a data reproducing device without a data recording function. Namely, data having been recorded in another device capable of classifying data based upon space category information and recording the classified data may be read into the data reproducing device with the classification results retained therein. Then, reproduction target data may be selected at the data reproducing device based upon the classification results and the space category information corresponding to the reproduction location. Such a data reproducing device may be a portable notebook-type personal computer with image files having been classified in a digital camera based upon space category information recorded in a hard disk thereof and, in response to an image reproduction instruction issued by the user, reproduction target image files may be selected based upon the space category information corresponding to the reproduction location.

Figure 5:
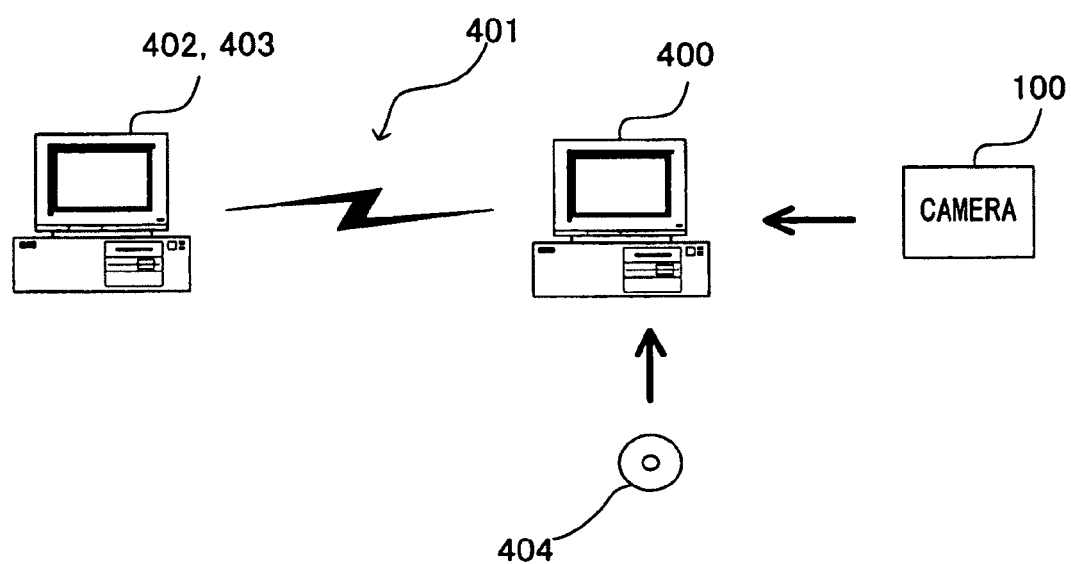

In addition, the present invention may be adopted in a personal computer or the like and, in such a case, a program based upon which the control described above is executed may be provided in a recording medium such as a CD-ROM or at a data signal on the Internet or the like. FIG. 5 illustrates how the program may be provided. A personal computer 400 receives the program via a CD-ROM 404. The personal computer 400 also has a connection capability that allows it to connect with a communication line 401. A computer 402 is a server computer that provides the program stored in a recording medium such as a hard disk 403. The communication line 401 may be a communication network such as the Internet or a communication network for personal computer communication, or it may be a dedicated communication line. The computer 402 reads out the program from the hard disk 403 and transmits the program to the personal computer 400 via the communication line 401. In other words, the program embodied as a data signal on a carrier wave is transmitted via the communication line 401. Thus, the program carne distributed as a computer-readable computer program product assuming any of various modes including a recording medium and a carrier wave.

While the invention has been particularly shown and described with respect to preferred embodiments andvariations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:
Japanese Patent Application No. 2006-198325 filed Jul. 20, 2006

The invention claimed is:

1. A data recording/reproducing device, comprising:
  a position detection unit that detects position information indicating a first position at which data are acquired, and detects position information indicating a second position at which data are reproduced;
  a determining unit that determines which specific set of geographical information, among a plurality of sets of geographical information defined in advance, the position information indicating the first position detected by the position detection unit corresponds to, and that determines which specific set of geographical information defined in advance, the position information indicating the second position detected by the position detection unit corresponds to;
  a recording control unit that records the acquired data into a recording medium based upon the specific set of geographical information regarding to the position information indicating the first position determined by the determining unit;
  a selection unit that selects reproduction-permitted data from the recording medium based upon the specific set of geographical information regarding to the position information indicating the second position determined by the determining unit; and
  a reproducing unit that outputs and reproduces at least one set of data among the reproduction-permitted data having been selected, wherein:
  the geographical information is constituted with information related to spatial areas (hereafter referred to as spatial area information) each indicating a specific range containing at least one of the first position and the second position; and
  the spatial area information includes a plurality of sets of information corresponding to at least a first spatial area and a second spatial area, access by unspecified third parties being prohibited in the first spatial area and access by unspecified third parties being not prohibited in the second spatial area.

2. A data recording/reproducing device according to claim 1, wherein:
  the recording control unit records the geographical information regarding to the position information indicating the first position into the recording medium together with the acquired data; and
  the selection unit searches the recording medium for data assigned with geographical information matching the geographical information regarding to the position information indicating the second position determined by the determining unit at the time of data reproduction and selects the searched data as the reproduction-permitted data.

3. A data recording/reproducing device according to claim 2, further comprising:
  a table creation unit that creates in advance a table containing the geographical information and the position information correlated with each other, wherein:
  the determining unit determines the geographical information by referencing the table based upon the detected position information indicating the first position, and determines the geographical information by the table based upon the detected position information indicating the second position.

4. A data recording/reproducing device according to claim 1, wherein:
  the recording control unit classifies the acquired data and records the acquired data into folders created in advance in the recording medium, each folder being in correspondence to a specific set of geographical information; and
  the selection unit selects data in a folder corresponding to the geographical information regarding to the position information indicating the second position as the reproduction-permitted data.

5. A data recording/reproducing device according to claim 4, further comprising:
  a folder creation unit that creates in advance folders each in correspondence to a specific set of geographical information correlated to the position information.

6. A data recording/reproducing device according to claim 1, wherein:
  the first spatial area is a private area and the second spatial area is a public area.

7. A data recording/reproducing device according to claim 1, wherein:
  when the spatial area information regarding to the first position corresponds to both the first spatial area and the second spatial area, the determining unit designates the spatial area information as information corresponding to the first spatial area.

8. A data recording/reproducing device according to claim 1, further comprising:
  a recognition unit that recognizes characteristics of the data, wherein:
  the determining unit determines spatial area information corresponding to the acquired data by taking into consideration recognition results provided by the recognition unit.

9. A data recording/reproducing device according to claim 1, wherein:
  if the spatial area information regarding to the second position corresponds to the first spatial area, the selection unit selects data designated with the spatial area information corresponding to both the first spatial area and the second spatial area regarding to the first position as the reproduction-permitted data, and if the spatial area information regarding to the second position corresponds to the second spatial area, the selection unit selects only data designated with the spatial area information corresponding to the second spatial area regarding to the first position as the reproduction-permitted data.

10. A data recording/reproducing device according to claim 9, wherein:

if the spatial area information regarding to the second position corresponds to both the first spatial area and the second spatial area, the spatial area information corresponding to the first spatial area is designated as the spatial area information for data reproduction.

11. A data recording/reproducing device according to claim 1, wherein:
the position detection unit pinpoints a position assumed by the data recording/reproducing device on a map by converting position information output from a GPS to coordinate values on the map.

12. A data recording/reproducing device according to claim 1, wherein:
the data include at least one of; still image data, video data and audio data.

13. A data recording/reproducing device comprising:
a position detection unit that detects position information indicating a first position at which data are acquired, and detects position information indicating a second position at which data are reproduced;
a determining unit that determines which specific set of geographical information, among a plurality of sets of geographical information defined in advance, the position information indicating the first position detected by the position detection unit corresponds to, and that determines which specific set of geographical information defined in advance, the position information indicating the second position detected by the position detection unit corresponds to;
a recording control unit that records the acquired data into a recording medium based upon the specific set of geographical information regarding to the position information indicating the first position determined by the determining unit;
a selection unit that selects reproduction-permitted data from the recording medium based upon the specific set of geographical information regarding to the position information indicating the second position determined by the determining unit; and
a reproducing unit that outputs and reproduces at least one set of data among the reproduction-permitted data having been selected, wherein:
the geographical information is constituted with information related to spatial areas (hereafter referred to as spatial area information) each indicating a specific range containing at least one of the first position and the second position; and
the spatial areas are each made up with an area taking up a specific range on the map, as defined by a central position indicating a specific point on the map and a specific radius centered on the central position.

14. A data recording/reproducing program recorded in a non-transitory computer readable medium enabling a computer to execute:
a position detection procedure through which position information indicating a first position at which data are acquired, is detected, and through which position information indicating a second position at which data are reproduced is detected;
a determining procedure through which the position information indicating the first position detected through the position detection procedure is determined to correspond to one of a plurality of sets of geographical information defined in advance, and through which the position information indicating the second position detected through the position detection procedure is determined to correspond to one of the plurality of sets of geographical information;
a recording control procedure through which the acquired data are recorded into a recording medium based upon the geographical information regarding to the position information indicating the first position;
a selection procedure through which reproduction-permitted data are selected from the recording medium based upon the geographical information regarding to the position information indicating the second position; and
a reproduction procedure through which at least one set of reproduction-permitted data among the selected reproduction-permitted data is output and reproduced, wherein:
the geographical information is constituted with information related to spatial areas (hereafter referred to as spatial area information) each indicating a specific range containing at least one of the first position and the second position; and
the spatial area information includes a plurality of sets of information corresponding to at least a first spatial area and a second spatial area, access by unspecified third parties being prohibited in the first spatial area and access by unspecified third parties being not prohibited in the second spatial area.

15. A data reproducing device that reads data files each assigned with a specific set of geographical information among a plurality of sets of geographical information defined in advance and reproduces data contained in the files, comprising:
a position detection unit that detects position information indicating a position at which the data files having been read are reproduced;
a determining unit that determines which specific set of geographical information, among the plurality of sets of geographical information defined in advance, the position information detected by the position detection unit at a time of data reproduction corresponds to;
a selection unit that selects reproduction-permitted data from the recording medium based upon the geographical information determined by the determining unit at the time of data reproduction; and
a reproduction unit that outputs and reproduces at least one set of reproduction-permitted data among the selected reproduction-permitted data, wherein:
the geographical information is constituted with information related to spatial areas (hereafter referred to as spatial area information) each indicating a specific range containing at least one of the first position and the second position; and
the spatial area information includes a plurality of sets of information corresponding to at least a first spatial area and a second spatial area, access by unspecified third parties being prohibited in the first spatial area and access by unspecified third parties being not prohibited in the second spatial area.

16. A data reproducing device according to claim 15, wherein:
the data files each contain data constituted with the geographical information together with the data to be reproduced; and
the selection unit searches through the data files having been read based upon the geographical information determined at the time of data reproduction and selects data assigned with geographical information matching the geographical information at a time of data acquisition as the reproduction-permitted data.

17. A data reproducing device according to claim 15, wherein:
the data files each contain data classified and recorded into a specific folder among folders each corresponding to a set of geographical information; and
the selection unit selects data contained in a folder corresponding to the geographical information determined at the time of data reproduction as the reproduction-permitted data.

18. A data reproducing method adopted when reading data files each assigned with a specific set of geographical information among a plurality of sets of geographical information defined in advance and reproducing data in the files, comprising:
detecting position information indicating a position at which the data files are to be read and reproduced;
determining a specific set of geographical information among the plurality of sets of geographical information defined in advance, to which the detected position information at a time of data reproduction, corresponds; and
selecting reproduction-permitted data from the recording medium based upon the determined geographical information at the time of data reproduction and reproducing the selected reproduction-permitted data, wherein:
the geographical information is constituted with information related to spatial areas (hereafter referred to as spatial area information) each indicating a specific range containing at least one of the first position and the second position; and
the spatial area information includes a plurality of sets of information corresponding to at least a first spatial area and a second spatial area, access by unspecified third parties being prohibited in the first spatial area and access by unspecified third parties being not prohibited in the second spatial area.

19. A data recording/reproducing device that records data into a recording medium and reproduces the data from the recording medium, comprising:
a position detection unit that detects position information indicating a first position at which data are acquired, and detects position information indicating a second position at which data are reproduced;
a determining unit that determines a first privacy protection level based upon which specific set of geographical information, among a plurality of sets of geographical information defined in advance, the position information indicating the first position detected by the position detection unit corresponds to, and that determines a second privacy protection level based upon which specific set of geographical information defined in advance, the position information indicating the second position detected by the position detection unit corresponds to;
a comparison unit that compares the first privacy protection level and the second privacy protection level;
a selection unit that selects data from the recording medium which have the first privacy protection level equal to or lower than the second privacy protection level, as reproduction-permitted data, based upon a result of the comparison unit; and
a reproducing unit that outputs and reproduces at least one set of data among the reproduction-permitted data having been selected by the selection unit.

* * * * *